United States Patent
Burgess et al.

(10) Patent No.: US 9,084,161 B2
(45) Date of Patent: Jul. 14, 2015

(54) FEMTOCELL HAND-OFFS

(75) Inventors: John K. Burgess, Morristown, NJ (US); Robin J. Thompson, Batavia, IL (US); Donna Michaels Sand, Redmond, WA (US)

(73) Assignee: Alcatel Lucent, Boulogne-Billancourt (FR)

( * ) Notice: Subject to any disclaimer, the term of this patent is extended or adjusted under 35 U.S.C. 154(b) by 2066 days.

(21) Appl. No.: 12/164,546

(22) Filed: Jun. 30, 2008

(65) Prior Publication Data

US 2009/0323633 A1  Dec. 31, 2009

(51) Int. Cl.
*H04W 4/00* (2009.01)
*H04W 36/00* (2009.01)
*H04W 84/04* (2009.01)

(52) U.S. Cl.
CPC ...... *H04W 36/0061* (2013.01); *H04W 36/0083* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 6,061,337 | A * | 5/2000 | Light et al. | 370/331 |
| 6,728,540 | B1 | 4/2004 | DeSantis et al. | |
| 7,085,570 | B2 * | 8/2006 | Tigerstedt et al. | 455/439 |
| 2004/0121770 | A1 | 6/2004 | Tigerstedt et al. | |
| 2007/0254620 | A1 | 11/2007 | Lindqvist et al. | |
| 2008/0132239 | A1 * | 6/2008 | Khetawat et al. | 455/438 |
| 2009/0131049 | A1 * | 5/2009 | Osborn | 455/435.1 |

FOREIGN PATENT DOCUMENTS

| | | |
|---|---|---|
| EP | 1655986 A2 | 5/2006 |
| WO | 2008055251 A2 | 5/2008 |

OTHER PUBLICATIONS

International Preliminary Report on Patentability for International application No. PCT/US2009/002955 mailed Jan. 13, 2011.
International Search Report and Written Opinion for International application No. PCT/US2009/002955 mailed Aug. 17, 2009.

* cited by examiner

*Primary Examiner* — Noel Beharry
*Assistant Examiner* — Kodzovi Acolatse
(74) *Attorney, Agent, or Firm* — Carlson, Gaskey & Olds, P.C.

(57) ABSTRACT

An exemplary method of facilitating hand-offs between Femtocells includes receiving an indication of a cell identifying code detected by a mobile station currently communicating with a serving Femtocell. A determination is made whether the received cell identifying code corresponds to a known Femtocell. The known Femtocell becomes a target Femtocell if a successful hand-off was previously made from the serving Femtocell to the known Femtocell. A hand-off is instigated to the target Femtocell.

13 Claims, 2 Drawing Sheets

FEMTOCELL HAND-OFFS

1. FIELD OF THE INVENTION

This invention generally relates to communication. More particularly, this invention relates to wireless communications.

2. DESCRIPTION OF THE RELATED ART

Wireless communication systems are well known and in widespread use. Personal wireless communication devices such as cellular phones, personal digital assistants and notebook computers provide convenient communication abilities under a wide variety of circumstances. There are instances, however, in which it is not possible to establish a reliable link with a wireless communication network. One example scenario is when a mobile station is taken indoors or into a region where the established wireless communication network does not provide coverage.

One approach to increasing wireless communications coverage is to install picocell or Femtocell base stations in areas where coverage is not adequate from a macrocell base station transceiver. The introduction and proliferation of Femtocell base stations expands the availability of wireless services but also introduces new challenges.

There are a limited number of cell identifying codes such as PN offsets, which are used in CDMA, or scrambling codes, which are used in UMTS. The term "identifying code" as used in this description applies to all such exemplars in wireless technologies. and it becomes impossible to uniquely identify all Femtocell base stations when many of them are installed in relatively close proximity to each other. For example, a corporate campus may have many Femtocells installed to provide coverage across the entire campus. It is desirable for all such Femtocells to be able to hand-off calls between them as mobile stations move within the coverage area of the cluster. In many situations, the cell identifying codes will have to be re-used even within the cluster. This presents a challenge to managing hand-offs between Femtocells.

It is not practical, for example, to manually configure neighbor lists for many Femtocells for facilitating hand-offs. There is a need for a hand-off facilitating technique that allows for efficient and reliable hand-offs between Femtocells.

SUMMARY

An exemplary method of facilitating hand-offs between Femtocells includes receiving an indication of a cell identifying code detected by a mobile station currently communicating with a serving Femtocell. A determination is made whether the received cell identifying code corresponds to a known Femtocell. The known Femtocell becomes a target Femtocell if a successful hand-off was previously made from the serving Femtocell to the known Femtocell. A hand-off is instigated to the target Femtocell.

If there is no known Femtocell corresponding to the received cell identifying code to which a successful hand-off has previously been made from the serving Femtocell, then a plurality of Femtocells corresponding to the received cell identifying code are instructed to attempt to complete the hand-off. The identity of the Femtocell that successfully completes the hand-off is saved for subsequent hand-off procedures.

The various features and advantages of the disclosed examples will become apparent to those skilled in the art from the following detailed description. The drawings that accompany the detailed description can be briefly described as follows.

DETAILED DESCRIPTION

Figure 1:
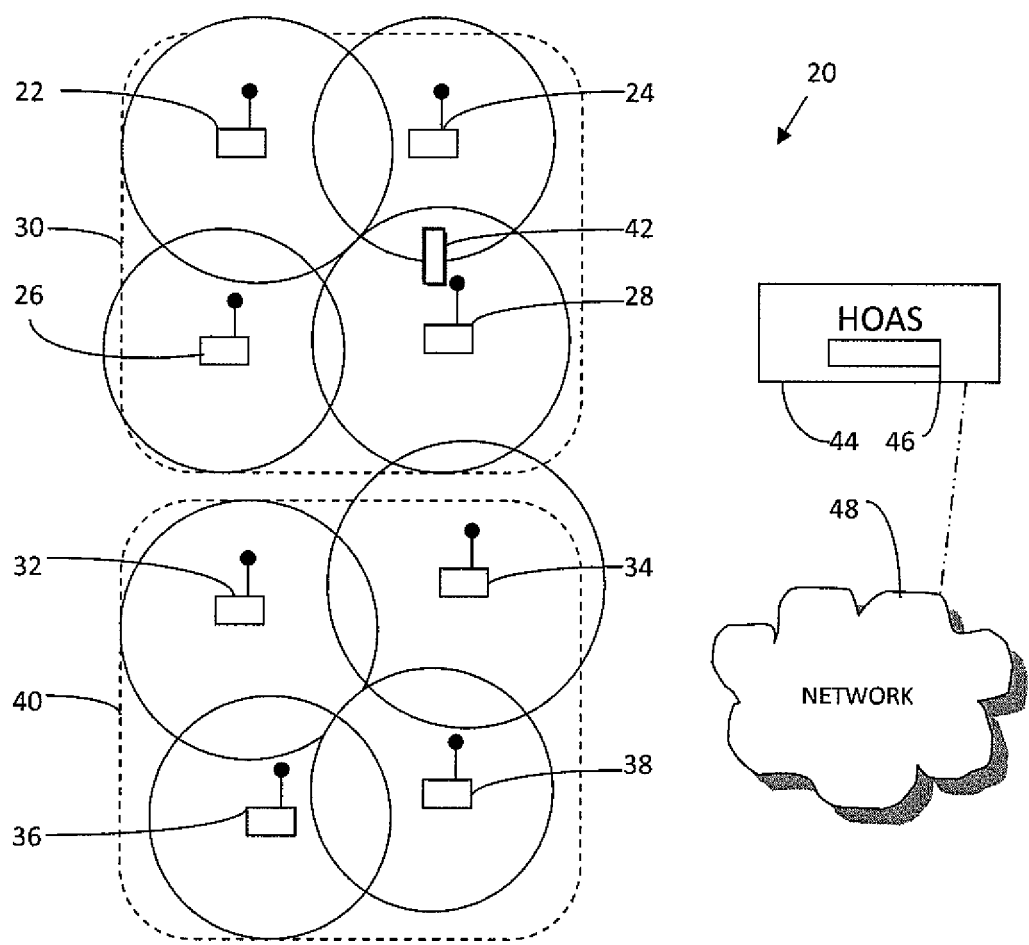
FIG. 1 schematically illustrates selected portions of a wireless communication system designed according to an embodiment of this invention.

FIG. 1 schematically shows selected portions of a wireless communication system 20. A plurality of Femtocell base stations 22, 24, 26 and 28 are arranged in a first cluster to provide wireless coverage in an area schematically shown at 30. In one example, a cluster of Femtocells is established by assigning the same network identifier to every Femtocell in a cluster. Each Femtocell coverage area is represented schematically by the circle around each Femtocell base station. In one example, the first cluster is installed to provide coverage for individuals at the location of a corporate facility.

Another plurality of Femtocell base stations 32, 34, 36 and 38 are arranged in a second cluster to provide wireless coverage in an area schematically shown at 40. The second cluster in one example is installed to provide coverage for individuals at the location of another corporate facility in close proximity to that of the other corporate facility.

A limited number of Femtocells are illustrated for discussion purposes. Those skilled in the art will realize how the illustrated and discussed examples will apply in situations having greater numbers of Femtocells and in which Femtocells are in coverage areas overlapping with macrocell base station coverage. For example, there may be hundreds or thousands of Femtocells established in a particular geographic region and the techniques of the examples of this description are useful with a selected number of Femtocells far beyond the several that are illustrated in FIG. 1.

In this example, each cluster has an associated set of authorized users who can use their mobile stations to conduct wireless communications through the corresponding femto base stations. There will be times when a user is moving within a cluster and a hand-off is desired between Femtocell base stations within a cluster. For example, a mobile station 42 is moving out of the coverage area of the Femtocell base station 24 and approaching that of the Femtocell base station 28. In such a circumstance, it is desirable to facilitate a hand-off between the Femtocell base stations without undesirably increasing the signaling load necessary to successfully complete the handoff.

The example of FIG. 1 includes a hand-off application server (HOAS) 44 that manages hand-offs among at least the illustrated Femtocells. This example includes a memory portion 46 associated with the HOAS 44. The memory portion 46 includes a database of information regarding previously successful hand-offs between the Femtocells. In some examples, the memory portion 46 is part of the HOAS 44. In other examples, the memory portion 46 is part of another device and the HOAS 44 has appropriate access to it.

The information regarding previously successful hand-offs facilitates on-going and future hand-offs among the Femtocells. The HOAS 44 communicates with appropriate portions of a communication network 48 to facilitate communications between mobile stations, the Femtocell base stations and other devices. The various communication connections between the femto base stations, the HOAS 44 and the network 48 are not shown to simplify the illustration. Those skilled in the art who have the benefit of this description will realize what devices need to interact with each other to realize desired communications on behalf of one or more users accessing wireless communication coverage through one or more of the Femtocell base stations.

The HOAS in one example is a device having hardware, software, firmware or a combination of these dedicated to performing the functions of the example HOAS 44. In another example, the HOAS is implemented as part of a mobile switching center. In another example, the HOAS is implemented as part of a base station controller.

Figure 2:
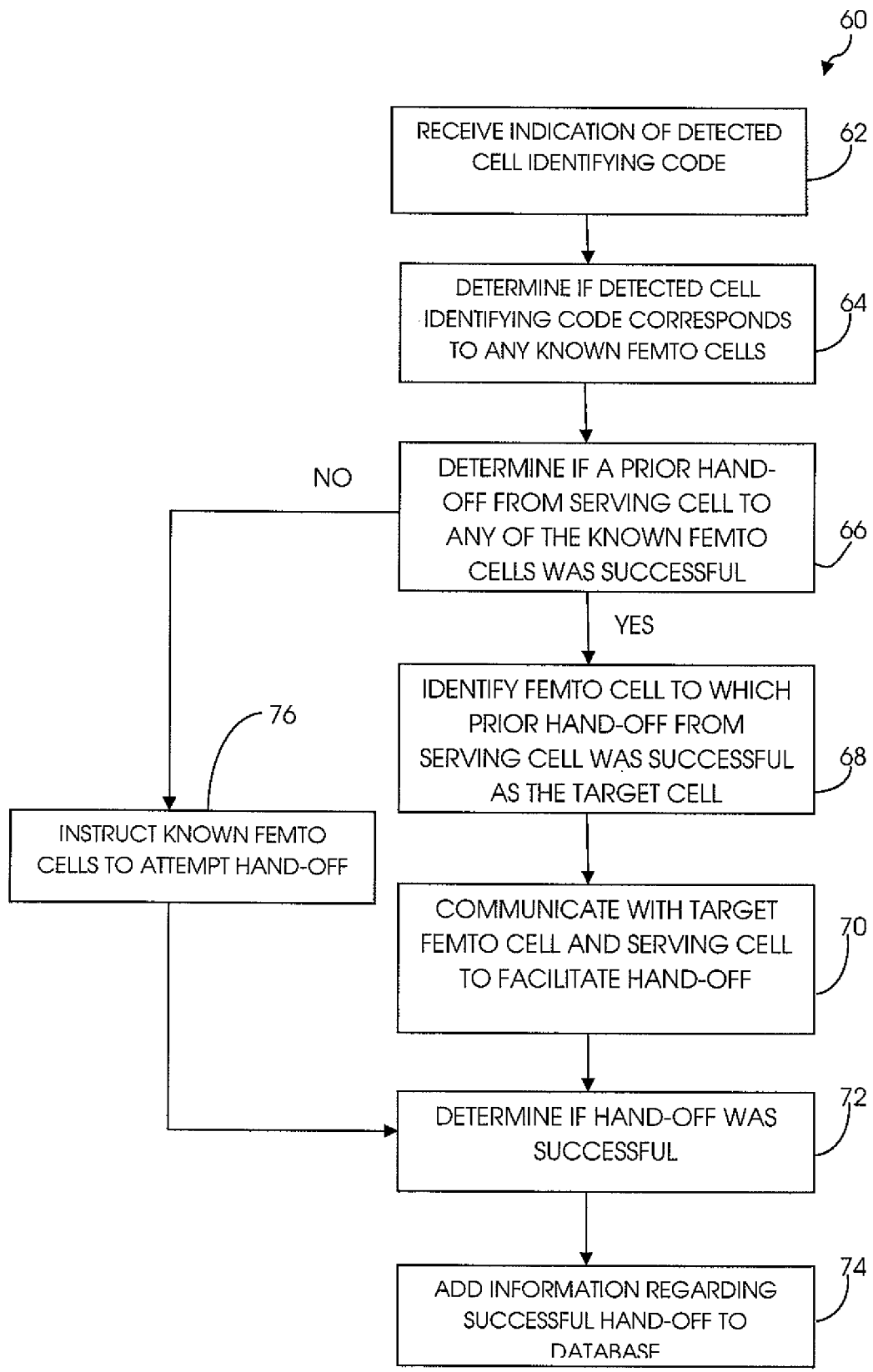
FIG. 2 is a flow chart diagram summarizing example hand-off procedures according to an embodiment of this invention.

A flow chart diagram 60 in FIG. 2 summarizes an example approach for facilitating hand-offs between Femtocell base stations. In this example, the mobile station 42 currently is communicating over a link with the Femtocell base station 24, which is referred to as the serving Femtocell in the following description. A signal from the Femtocell base station 28 has been detected by the mobile station 42 with adequate signal quality (e.g., strength) that the Femtocell base station 28 is a potential target cell for a hand-off.

In the example of FIG. 2, the mobile station 42 sends a message (e.g., a pilot strength measurement message or a route update message) to the serving Femtocell that it has detected a potential target Femtocell. In this example, the mobile station 42 provides an indication of a cell identifying code detected by the mobile station 42. The cell identifying code comprises a pseudo noise offset (PN offset) in one example and a scrambling code in another example.

The serving cell receives the cell identifying code and reports it to the HOAS 44 at 62 in this example. Some implementations will include the serving cell making a determination whether the cell identifying code corresponds to a Femtocell before making the report at 62. The message to the HOAS 44 in one example comprises a SIP message such as SIP INFO or SIP MESSAGE. The report to the HOAS 44 includes or is interpreted as a hand-off request. The serving cell also provides the HOAS 44 information regarding the current unique reverse link with the mobile station 42, the serving cell identity in this example.

The HOAS 44 compares the detected cell identifying code with information in the memory portion 46 to determine whether the detected cell identifying code corresponds to any of the Femtocells known to the HOAS 44 at 64. In the illustrated example, only a few Femtocells are shown for simplicity. In some cases, the HOAS 44 considers a relatively large number of Femtocells having a cell identifying code corresponding to the one detected by the mobile station 42. In situations where the search results produce large numbers of known Femtocells having corresponding cell identifying codes, the HOAS 44 uses selection criteria such as Femtocells within a related cluster, Femtocells within a selected geographic range of the serving cell (if the longitude and latitude of Femtocells is known within the database 46, for example), Femtocells to which the mobile station 42 has authorized access, or a combination of these criteria.

If the detected cell identifying code belongs to one or more known Femtocells, at 66 the HOAS 44 determines whether any successful hand-offs have previously been made between the serving cell 24 and any of the known Femtocells having a cell identifying code corresponding to the one reported by the mobile station 42. If a previously successful hand-off has been completed between the serving Femtocell and one of the known Femtocells with a matching identifying code, that Femtocell is identified as the target cell for the hand-off at 68. In some examples, the number of identifying codes is very limited and it is possible to have two Femtocells in the same cluster with matching identifying codes. For such situations, the identification at 68 includes at least identifying the highest priority targets.

In this example, when only one target Femto is identified, the HOAS 44 communicates with the serving and target cells at 70 to facilitate the hand-off. For example, the HOAS 44 provides a message to the target cell Femtocell instructing it to choose a Walsh function or MacID from those the Femtocell base station 28 has reserved for incoming hand-offs. The target cell notifies the HOAS 44 of the selection.

In some cases, the HOAS 44 will choose from among several possible Walsh functions or MacIDs. In such cases, the example HOAS 44 prioritizes such resources based on recent hand-off success, location, mobile access and past usage. The HOAS 44 then sends a message to the target cell regarding which one to use to look for the unique reverse link of the mobile station 42. The HOAS 44 and the target cell communicate as necessary regarding whether the selection made by the HOAS 44 is available and eventually, one is chosen and used by the target cell to set up a traffic channel to search for the mobile.

If the target cell detects the mobile station, it notifies the HOAS 44 of the same. The HOAS 44 then reconfigures the media path to the generic user agent in the target Femtocell. The HOAS 44 in one example sends a SIP message to trigger the serving Femtocell to send a hand-off direction message. The serving Femtocell responsively sends a hand-off direction message to the mobile station.

A determination is made at 72 whether the mobile station succeeds at completing the intended hand-off. In this example, the target femto base station 28 sends a message to the HOAS 44 regarding the hand-off. At 74, the HOAS 44 makes an indication in the database in the memory portion 46 regarding the successful hand-off. Information such as mobile identity, previous serving cell, current serving cell (i.e., the previous target cell) and a current time of accessing the new Femtocell by the mobile station, for example. This update to the information in the memory portion 46 is useful for future potential hand-offs from the previous serving cell to the new serving cell.

In one example, the HOAS 44 will also communicate with the network 48 to remove any unused traffic path trunks to the media gateway, to the old serving Femtocell. The HOAS 44 also notifies the old serving Femtocell that the call has transferred and the old connection resources can be released.

The new serving Femtocell re-registers the IMS user to change the contact address from the old Femtocell to the new Femtocell in order for subsequent call delivery procedures to locate the user. After successful re-registration, the new Femtocell initiates reconfiguration of the session via a message such as a SIP REFER method so the core network 48 is connected to the user agent for the actual end user. This ensures that subsequent calls of feature requests are correctly handled.

In some cases, there will not have been a previously successful hand-off to a Femtocell corresponding to the detected cell identifying code, or there may have been several Femtocells with identical identifying codes where only some proportion of the successful hand-offs from this source go to any individual Femtocell. In such cases, the example of FIG. 2 includes a procedure at 76 that involves a plurality of potential target Femtocells. The HOAS 44 selects a plurality of potential target Femtocells based on information regarding proximity to the serving Femtocell, for example. The HOAS 44 in one example prioritizes which known Femtocells to include in the potential hand-off based on recent hand-off success, location, mobile access and past usage. The HOAS 44 suggests a Walsh function or MacID to the potential target Femtocells. Each makes a determination whether the proposal is acceptable. Eventually, an agreed upon resource is selected and the HOAS 44 instructs each of them to look for the mobile station similar to the manner described above. The one that successfully detects the mobile station notifies the HOAS 44 and it is identified and selected as the target Femtocell for the hand-off. If the hand-off is successfully completed, that is determined at 72. Information regarding the successful hand-off is stored in the memory portion 46 at 74.

When multiple Femtocells participated in attempting the hand-off, appropriate messages are exchanged to release resources that were being used to attempt the hand-off.

The disclosed examples are useful to facilitate and manage hand-offs between Femtocells. Using information regarding a previously successful hand-off from a current serving Femtocell allows for identifying the appropriate target Femtocell even in situations in which multiple Femtocells having the same cell identifying code are within relatively close proximity to the current serving cell. Selecting the one that was involved in a previously successful hand-off minimizes the signaling and resource reservation required to attempt the hand-off. Additionally, the limited number of possible Femtocell identifying codes can be handled in an effective and efficient manner.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of facilitating hand-offs between Femtocells, comprising the steps of:
   receiving a message at a current serving Femtocell from a mobile station communicating with the current serving Femtocell, the message indicating that the mobile station detected a potential target Femtocell, the message including an indication of a cell identifying code of the detected Femtocell;
   determining whether the cell identifying code corresponds to a known Femtocell;
   using the detected Femtocell as a target Femtocell if the cell identifying, code corresponds to a known Femtocell and a successful hand-off was previously made from the serving Femtocell to the detected Femtocell; and
   instigating a hand-off from the current serving Femtocell to the target Femtocell.

2. The method of claim 1, comprising
   determining that the hand-off was successful; and
   indicating an identity of the Femtocell to which the successful hand-off was made in a database used for subsequent determinations regarding target Femtocells.

3. The method of claim 1, comprising
   maintaining a database of successful hand-offs between Femtocells including an indication of the Femtocells involved in each successful hand-off; and
   consulting the database to determine whether a potential target Femtocell has successfully completed a hand-off from the serving Femtocell.

4. A method of facilitating hand-offs between Femtocells, comprising the steps of:
   receiving a message at a current serving Femtocell from a mobile station communicating with the current serving Femtocell, the message indicating that the mobile station detected a potential target Femtocell, the message including an indication of a cell identifying code of the detected Femtocell;
   determining whether the cell identifying code corresponds to a known Femtocell;
   determining that there is more than one Femtocell corresponding to the cell identifying code or that no known Femtocell corresponds to the cell identifying code;
   selecting a plurality of known Femtocells cells;
   instructing each of the selected plurality of known Femtocells to attempt to detect the mobile station;
   receiving a mobile detection indication from any of the selected Femtocells that detected the mobile station; and
   instigating a hand-off from the serving Femtocell to the one of the selected Femtocells that provided the mobile detection indication.

5. The method of claim 4, comprising
   determining whether the instigated hand-off is successful; and
   identifying the target Femtocell as one that successfully completed the hand-off from the serving Femtocell.

6. The method of claim 5, comprising
   storing information regarding the Femtocell successfully completing the hand-off from the serving Femtocell.

7. A device for facilitating hand-offs between Femtocells, comprising:
   a hand-off application server configured to
      receive a message at a current serving Femtocell from a mobile station communicating with the current serving Femtocell, the message indicating that the mobile station detected a potential target Femtocell, the message including an indication of a cell identifying code of the detected Femtocell;
      determine whether the cell identifying code corresponds to a known Femtocell;
      use the detected Femtocell as a target Femtocell if the cell identifying code corresponds to a known Femtocell and a successful hand-off was previously made from the serving Femtocell to the detected Femtocell; and
      instigate a hand-off from the current serving Femtocell to the target Femtocell.

8. The device of claim 7, comprising
   a database of successful hand-offs between Femtocells including an indication of the Femtocells involved in each successful hand-off.

9. The device of claim 8, wherein the hand-off application server is configured to
   determine that the hand-off was successful; and
   indicate an identity of the Femtocell to which the successful hand-off was made in a database used for subsequent determinations regarding target Femtocells.

10. The device of claim 8, wherein the hand-off application server is configured to consult the database to determine whether a potential target Femtocell has successfully completed a hand-off from the serving Femtocell.

11. A device for facilitating hand-offs between Femtocells comprising a hand-off application server that is configured to
   determine that a message is received at a current serving Femtocell from a mobile station communicating with the current serving Femtocell, the message indicating that the mobile station detected a potential target Femtocell, the message including an indication of a cell identifying code of the detected Femtocell;
   determine whether the cell identifying code corresponds to a known Femtocell;

determine that there is more than one Femtocell corresponding to the cell identifying code or that no known Femtocell corresponds to the cell identifying code;

select a plurality of known Femtocells;

instruct each of a selected plurality of known Femtocells to attempt to detect the mobile station;

determine that there is at least one mobile detection indication from any of the selected Femtocells that detected the mobile station; and instigate a hand-off from the serving Femtocell to the one of the selected Femtocells that provided the mobile detection indication.

12. The device of claim 11, wherein the hand-off application server is configured to determine whether the instigated hand-off is successful; and identify the target Femtocell as one that successfully completed the hand-off from the serving Femtocell.

13. The device of claim 12, wherein the hand-off application server is configured to store information regarding the Femtocell successfully completing the hand-off from the serving Femtocell in the database.

\* \* \* \* \*